United States Patent
MacInnis et al.

(10) Patent No.: US 7,505,636 B2
(45) Date of Patent: Mar. 17, 2009

(54) SYSTEM AND METHOD FOR TWO-PASS INTERPOLATION FOR QUARTER-PEL MOTION COMPENSATION

(75) Inventors: Alexander MacInnis, Lake Oswego, OR (US); Sheng Zhong, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 795 days.

(21) Appl. No.: 10/984,147

(22) Filed: Nov. 9, 2004

(65) Prior Publication Data

US 2005/0196073 A1    Sep. 8, 2005

Related U.S. Application Data

(60) Provisional application No. 60/550,243, filed on Mar. 4, 2004.

(51) Int. Cl.
*G06K 9/32* (2006.01)
*G06K 9/00* (2006.01)

(52) U.S. Cl. .................................................. 382/300

(58) Field of Classification Search ......... 382/299–300, 382/260–265, 232–251, 107; 348/441–448, 348/458–459, 453–456, 704; 375/240.01–240.29
See application file for complete search history.

(56) References Cited

U.S. PATENT DOCUMENTS

| 5,249,038 | A | * | 9/1993 | Stec | 348/453 |
| 5,276,515 | A | * | 1/1994 | Katsumata et al. | 348/704 |
| 7,408,988 | B2 | * | 8/2008 | Linzer et al. | 375/240.16 |
| 7,409,099 | B1 | * | 8/2008 | Ameres et al. | 382/239 |

* cited by examiner

*Primary Examiner*—Sherali Ishrat
(74) *Attorney, Agent, or Firm*—McAndrews, Held & Malloy, Ltd.

(57) ABSTRACT

Methods and systems for processing a video signal are disclosed herein. Pixels may be interpolated utilizing at most two passes. During a first of the two passes, an aligned sub-pixel value may be interpolated utilizing a plurality of integer pixel values, if the aligned sub-pixel value is horizontally or vertically aligned with the plurality of integer pixel values. During a second of the two passes, a non-aligned sub-pixel value may be interpolated utilizing the interpolated aligned sub-pixel value, if the non-aligned sub-pixel value is not horizontally or vertically aligned with the plurality of integer pixel values. The aligned sub-pixel value may be interpolated utilizing 4-tap filtering of the integer pixel values.

23 Claims, 4 Drawing Sheets

SYSTEM AND METHOD FOR TWO-PASS INTERPOLATION FOR QUARTER-PEL MOTION COMPENSATION

CROSS-REFERENCE TO RELATED APPLICATIONS

This application makes reference to, claims priority to, and claims the benefit of U.S. Provisional Application Ser. No. 60/550,243, filed Mar. 4, 2004, and entitled "System and Method for Two-Pass Interpolation for Quarter-Pel Motion Estimation."

This application makes reference to U.S. application Ser. No. 10/247,940, filed Sep. 20, 2002, entitled "Method and Apparatus for Improved Estimation and Compensation in Digital Video Compression and Decompression."

The above stated applications are hereby incorporated herein by reference in their entirety.

FIELD OF THE INVENTION

Certain embodiments of the invention relate to processing of video signals. More specifically, certain embodiments of the invention relate to a system and method for two-pass interpolation for quarter-pel (pixel) motion compensation.

BACKGROUND OF THE INVENTION

With the evolution of new digital video standards, video compression formats are continuously evolving. One of the most commonly utilized video formats is MPEG-2 (ISO/IEC 13818-2). A next generation offshoot of the MPEG-2 standard, which is likely to become widespread, is MPEG-4 AVC, also known as ITU H.264 (ISO/IEC 14496-10), and referred to as "AVC." Existing pixel interpolation techniques and algorithms, such as the AVS (Advanced Video Standard) algorithm, require at least three passes. Such three-pass interpolation techniques and algorithms are generally complex and do not provide satisfactory compensation results.

The AVS specification (outlined in "Information Technology, Advanced Audio Video Coding, Part 2: Video," Committee Draft, 2003) utilizes three simple interpolation filters (two 4-tap filters and one 2-tap filter) to derive sub-pixel sample values for the purpose of inter-picture prediction, such as motion compensation (ME). Depending on the position of the sub-pixel sample position, three or more passes of filtering may be applied in order to get the interpolated sample value. Similar three-pass interpolation algorithms may be utilized, such as the MPEG AVC (or H.264) standard (outlined in ITU-T Rec. H.264 | ISO/IEC 14496-10, version JVT-I050). Such three-pass interpolation algorithms, however, are generally complex and may not provide satisfactory compensation results.

FIG. 1 is an illustration of conventional AVS and AVC three-pass interpolation for motion compensation. Referring to FIG. 1, there are illustrated sample interpolated sub-pixel and integer positions. For example, the pixels labeled by an upper-case letter, such as E, C, D, J, F, G, H, I, L, M, N, P, K, R, S and Q, may indicate integer position samples. The remaining lower-case letters, such as c1, bb, d1, a, b, c, d, e, f, g, h, i, j, k, m, n, p, q, r, c2, s, d2, c3, gg, and d3, may indicate interpolated sub-pixel positions that may need to be interpolated. Three passes of filtering may be required to derive the sample values for positions e, g, p and r, for example. More specifically, two 4-tap filtering and 2-tap averaging may be utilized to obtain interpolated pixels e, g, p and r.

For example, to obtain interpolated pixel e, the following three passes may be utilized: A first pass 101 may utilize 4-tap filtering to integer positions (E; C; D; J) to obtain interpolated pixel bb. Similarly, 4-tap filtering during the first pass 101 may be applied to integer positions (F; G; H; I), (L; M; N; P) and (K; R; S; Q) to obtain interpolated pixels b, s and gg, respectively. During a second pass 103 interpolated pixel j may be interpolated utilizing interpolated pixels bb, b, s, and gg, obtained from the first pass 101. Once interpolated pixel j is obtained during the second pass 103, pixel e may be interpolated in a third pass 105. During the third pass 105, pixel e may be interpolated by utilizing 2-tap averaging of the integer position G and the interpolated pixel j.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain aspects of the invention may be found in a method and system for processing a video signal. The method and system may utilize at most two (2) passes for interpolating quarter-pel motion compensation. In accordance with an aspect of the invention, pixels may be interpolated utilizing at most two passes. During a first of the two passes, an aligned sub-pixel value may be interpolated utilizing a plurality of integer positions, if the aligned sub-pixel value is horizontally or vertically aligned with the plurality of integer positions. During a second of the two passes, a non-aligned sub-pixel value may be interpolated utilizing the interpolated aligned sub-pixel value, if the non-aligned sub-pixel value is not horizontally or vertically aligned with the plurality of integer positions. The aligned sub-pixel value may be interpolated utilizing 4-tap filtering of the integer location pixel values. The 4-tap filtering of the integer location pixel values may comprise performing one or more of the following filtering operations:

$f1(x, y, z, w)=(-5x+56y+15z-2w+32)>>6;$ $f2(x, y, z, w)=(-5x+37y+37z-5w+32)>>6;$ and $f3(x, y, z, w)=(-2x+15y+56z-5w+32)>>6.$ The non-aligned sub-pixel value may be interpolated utilizing 4-tap filtering of the interpolated aligned sub-pixel value. The 4-tap filtering of the interpolated aligned sub-pixel value may comprise performing one or more of the following filtering operations:

$f1(x, y, z, w)=(-5x+56y+15z-2w+32)>>6;$ $f2(x, y, z, w)=(-5x+37y+37z-5w+32)>>6;$ and $f3(x, y, z, w)=(-2x+15y+56z-5w+32)>>6.$ The aligned sub-pixel value may be interpolated utilizing one or more polyphase filters to filter the integer positions. The non-aligned sub-pixel value may be interpolated utilizing one or more polyphase filters to filter the interpolated at least one aligned sub-pixel value.

Another aspect of the invention may provide a machine-readable storage, having stored thereon, a computer program having at least one code section executable by a machine, thereby causing the machine to perform the steps as described above for processing a video signal.

The system for processing a video signal may include an interpolator that interpolates pixels utilizing at most two passes. During a first of the two passes, the interpolator may interpolate an aligned sub-pixel value utilizing a plurality of integer positions, if the aligned sub-pixel value is horizontally or vertically aligned with the plurality of integer positions. During a second of the two passes, the interpolator may interpolate a non-aligned sub-pixel value utilizing the interpolated aligned sub-pixel value, if the non-aligned sub-pixel value is not horizontally or vertically aligned with the plurality of integer positions. The system may further comprise a filter such as a 4-tap filter, which may be utilized to filter the integer positions for aligned sub-pixels. The 4-tap filter may be adapted to filter the integer positions by performing one or more of the following filtering operations:

$$f1(x, y, z, w)=(-5x+56y+15z-2w+32)>>6;$$

$$f2(x, y, z, w)=(-5x+37y+37z-5w+32)>>6; \text{ and}$$

$$f3(x, y, z, w)=(-2x+15y+56z-5w+32)>>6.$$

The system may further comprise a filter such as a 4-tap filter, which may be utilized to filter the interpolated aligned sub-pixel values for non-aligned sub-pixels. The 4-tap filter may be adapted to filter the interpolated aligned sub-pixel values by performing one or more of the following filtering operations:

$$f1(x, y, z, w)=(-5x+56y+15z-2w+32)>>6;$$

$$f2(x, y, z, w)=(-5x+37y+37z-5w+32)>>6; \text{ and}$$

$$f3(x, y, z, w)=(-2x+15y+56z-5w+32)>>6.$$

The filters utilized to filter the integer positions for the aligned sub-pixel value may be polyphase filters. The system may further comprise a filter such as a polyphase filter, which may be utilized to filter the interpolated aligned sub-pixel values for non-aligned sub-pixels.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a system and method for two-pass interpolation for quarter-pel motion compensation. A quarter-pel sub-pixel interpolation algorithm, in accordance with an aspect of the present invention, may require at most two passes for filtering. In this regard, one pass may be utilized in the horizontal direction and/or one pass may be utilized in the vertical direction. Compared to a three-pass interpolation algorithm, such as the three-pass interpolation algorithm outlined in the AVS specification, an algorithm in accordance with an embodiment of the present invention may achieve better motion compensation results and lower complexity.

Figure 1:
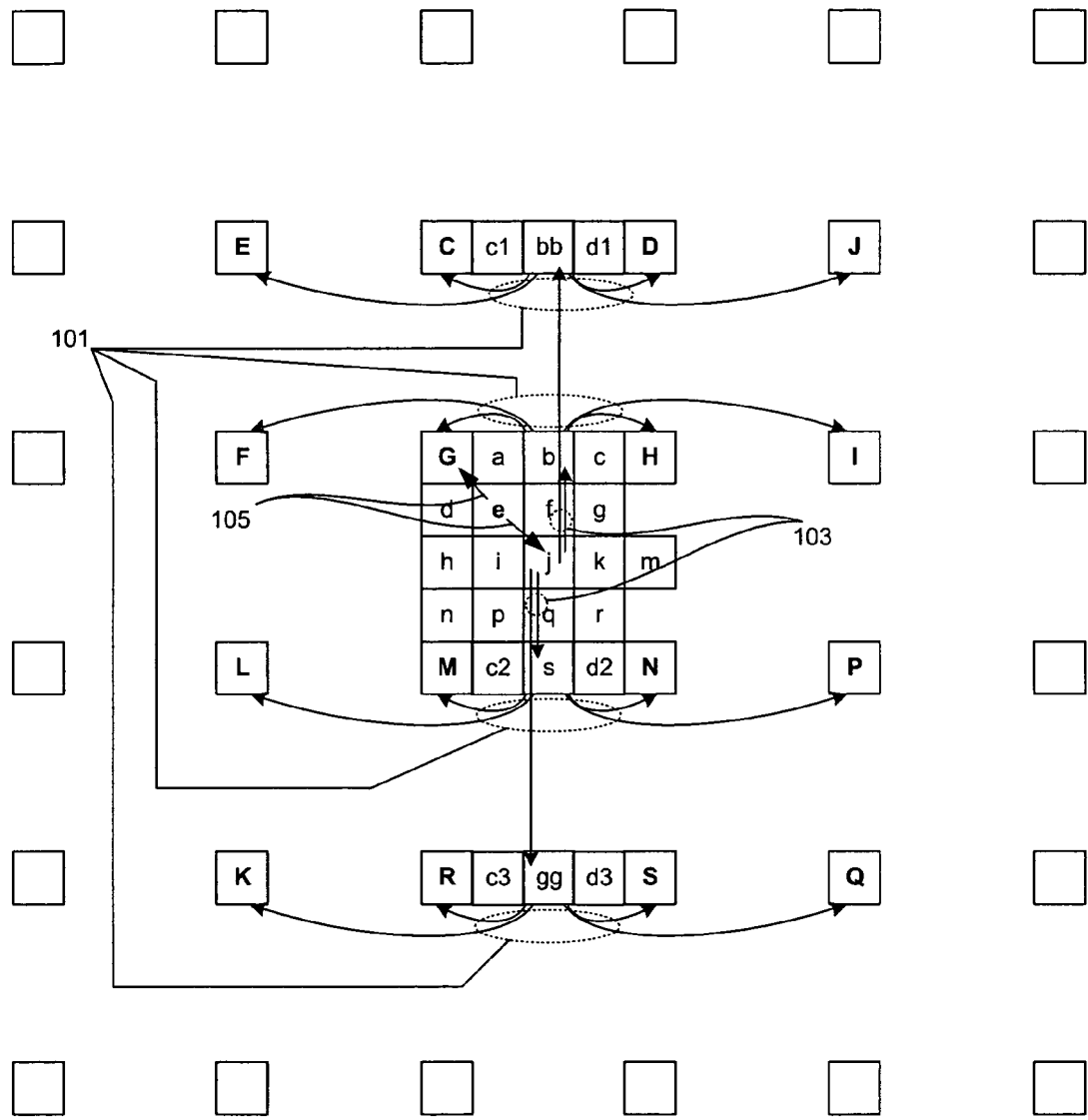
FIG. 1 is an illustration of conventional AVS and AVC three-pass interpolation for motion compensation.
Figure 2:
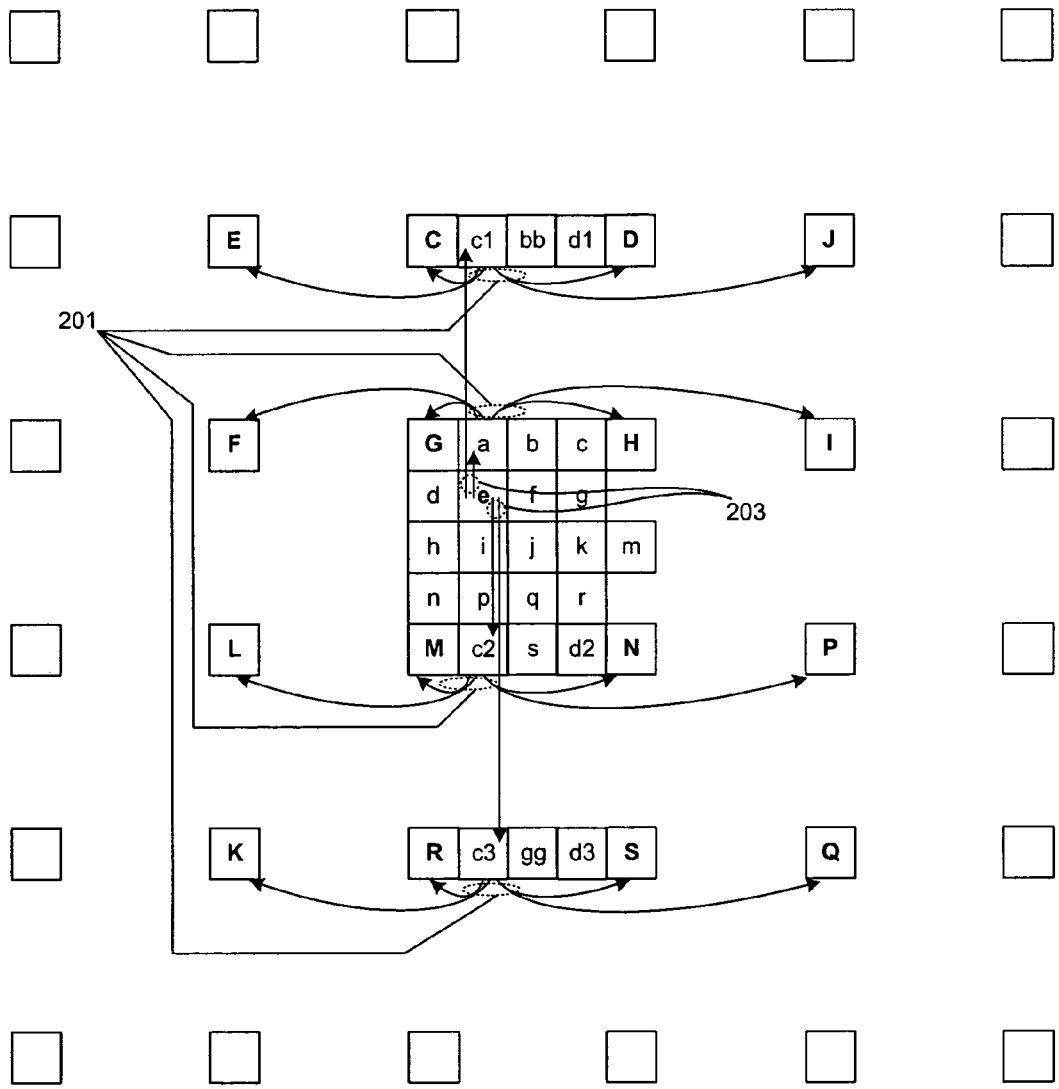
FIG. 2 is an illustration of two-pass interpolation for motion compensation, in accordance with an embodiment of the invention.

FIG. 2 is an illustration of two-pass interpolation for motion compensation, in accordance with an embodiment of the invention. Referring to FIG. 2, there are illustrated sample integer and sub-pixel positions. Similarly to FIG. 1, the pixels labeled by an upper-case letter, such as E, C, D, J, F, G, H, I, L, M, N, P, K, R, S and Q, may indicate integer position samples. The remaining lower-case letters, such as c1, bb, d1, a, b, c, d, e, f, g, h, i, j, k, m, n, p, q, r, c2, s, d2, c3, gg, and d3 may indicate sub-pixel positions that may need to be interpolated.

In one aspect of the invention, an interpolation process may be utilized so that all the sub-pixel sample values may be interpolated with no more than two passes of filtering. Referring again to FIG. 2, the integer positions may not be interpolated. Sub-pixels, however, indicated by the lower-case letters (c1, bb, d1, a, b, c, d, e, f, g, h, i, j, k, m, n, p, q, r, c2, s, d2, c3, gg, and d3) may be interpolated in one or two passes depending on their relative position with respect to the known integer positions. More specifically, sub-pixels, which are horizontally or vertically aligned with known integer positions, may be interpolated with only one pass. If sub-pixel positions are not horizontally or vertically aligned with known integer positions, then such sub-pixels may be interpolated with two passes.

For example, to obtain interpolated pixel e, the following two passes may be utilized: Interpolated pixels c1, a, c2 and c3 are horizontally aligned with integer positions (E; C; D; J), (F; G; H; I), (L; M; N; P) and (K; R; S; Q), respectively. Therefore, during a first pass 201, 4-tap filtering may be applied to each of the integer positions (E; C; D; J), (F; G; H; I), (L; M; N; P) and (K; R; S; Q) to obtain pixels c1, a, c2 and c3, respectively. During a second pass 203, 4-tap filtering may be applied to the interpolated pixels c1, a, c2 and c3 to obtain interpolated pixel e.

Similarly, to obtain interpolated pixel j, 4-tap filtering may be applied to each of the integer positions (E; C; D; J), (F; G; H; I), (L; M; N; P) and (K; R; S; Q) to obtain pixels bb, b, s and gg, respectively. During a second pass, 4-tap filtering may be applied to the interpolated pixels bb, b, s and gg to obtain interpolated pixel j. In this regard, sub-pixels a, b, c, d, h, and n may be interpolated with only one pass, and sub-pixels e, f, g, i, j, k, p, q and r may be interpolated with two passes.

Two-pass sub-pixel interpolation for quarter-pel motion compensation may utilize three 4-tap filtering operations, f1, f2 and f3. The filtering operations may be defined as:

$$f1(x, y, z, w)=(-5x+56y+15z-2w+32)>>6;$$

$$f2(x, y, z, w)=(-5x+37y+37z-5w+32)>>6;$$

$$f3(x, y, z, w)=(-2x+15y+56z-5w+32)>>6;$$

Although specific filtering coefficients are utilized for each of the filtering functions f1, f2, and f3, the present invention is not limited in this way. Other filtering coefficients may be utilized so that two-pass interpolation for motion compensation is achieved. The sub-pixels a, b, c d, h and n, which are vertically and/or horizontally aligned with integer positions (indicated with upper-case letters on FIG. 1) may be derived as follows:

$$a=f1(F, G, H, I)=(-5*F+56*G+15*H-2*I+32)>>6;$$

$$b=f2(F, G, H, I)=(-5*F+37*G+37*H-5*I+32)>>6;$$

$$c=f3(F, G, H, I)=(-2*F+15*G+56*H-5*I+32)>>6;$$

Sub-pixels a, b and c are horizontally aligned with F, G, H and I. Sub-pixels d, h and n may be derived as follows:

$d=f1(C, G, M, R)=(-5*C+56*G+15*M-2*R+32)>>6;$ $h=f2(C, G, M, R)=(-5*C+37*G+37*M-5*R+32)>>6;$ $n=f3(C, G, M, R)=(-2*C+15*G+56*M-5*R+32)>>6;$

Sub-pixels d, h, and n are vertically aligned with C, G, M and R.

The filtering operations f1, f2 and f3 may be utilized in accordance with the distance between the sub-pixel being interpolated and the known integer or sub-pixel that is used in the filtering operation. For example, filtering operation f1 may be utilized for interpolating sub-pixel a since sub-pixel a is one quarter pixel distance from the integer position G. Similarly, filtering operation f2 and f3 may be utilized for interpolating sub-pixels b and c, respectively, since sub-pixels b and c are two quarters and three quarters pixel distance from the integer position G, respectively.

Each of the sub-pixels e, f, g, i, j, k, p, q and r ("subject pixels") may be derived in a two-step interpolation. As an initial first step, sub-pixels aligned with the subject pixels may be interpolated. For example, sub-pixels c1, bb, d1, c2, s, d2, c3, gg and d3 may be interpolated in a similar way as the sub-pixels a, b, c, d, h, and n, as these sub-pixels are aligned with known integer positions. The interpolation may be achieved as follows:

$c1=f1(E, C, D, J);$ $bb=f2(E, C, D, J);$ $d1=f3(E, C, D, J);$

Sub-pixels c1, bb and d1 are horizontally aligned with integer positions E, C, D and J. Sub-pixels c2, s and d2 may be derived as follows:

$c2=f1(L, M, N, P);$ $s=f2(L, M, N, P);$ $d2=f3(L, M, N, P);$

Sub-pixels c2, s, and d2 are horizontally aligned with integer positions L, M, N and P. Sub-pixels c3, gg and d3 may be derived as follows:

$c3=f1(K, R, S, Q);$ $gg=f2(K, R, S, Q);$ $d3=f3(K, R, S, Q);$

Sub-pixels c3, gg and d3 are horizontally aligned with integer positions K, R, S and Q.

As a second step in the interpolation process, the subject pixels may be interpolated utilizing the sub-pixels interpolated above. The subject pixels e, f, g, i, j, k, p, q and r may be derived as follows:

$e=f1(c1, a, c2, c3);$ $i=f2(c1, a, c2, c3);$ $p=f3(c1, a, c2, c3);$

Subject pixels e, i and p are vertically aligned with interpolated sub-pixels c1, a, c2 and c3. Subject pixels f, j and q may be derived as follows:

$f=f1(bb, b, s, gg);$ $j=f2(bb, b, s, gg);$ $q=f3(bb, b, s, gg);$

Subject pixels f, j and q are vertically aligned with interpolated sub-pixels bb, b, s and gg. Subject pixels g, k and r may be derived as follows:

$g=f1(d1, c, d2, d3);$ $k=f2(d1, c, d2, d3);$ $r=f3(d1, c, d2, d3);$

Subject pixels g, k and r are vertically aligned with interpolated sub-pixels d1, c, d2 and d3.

Figure 3:
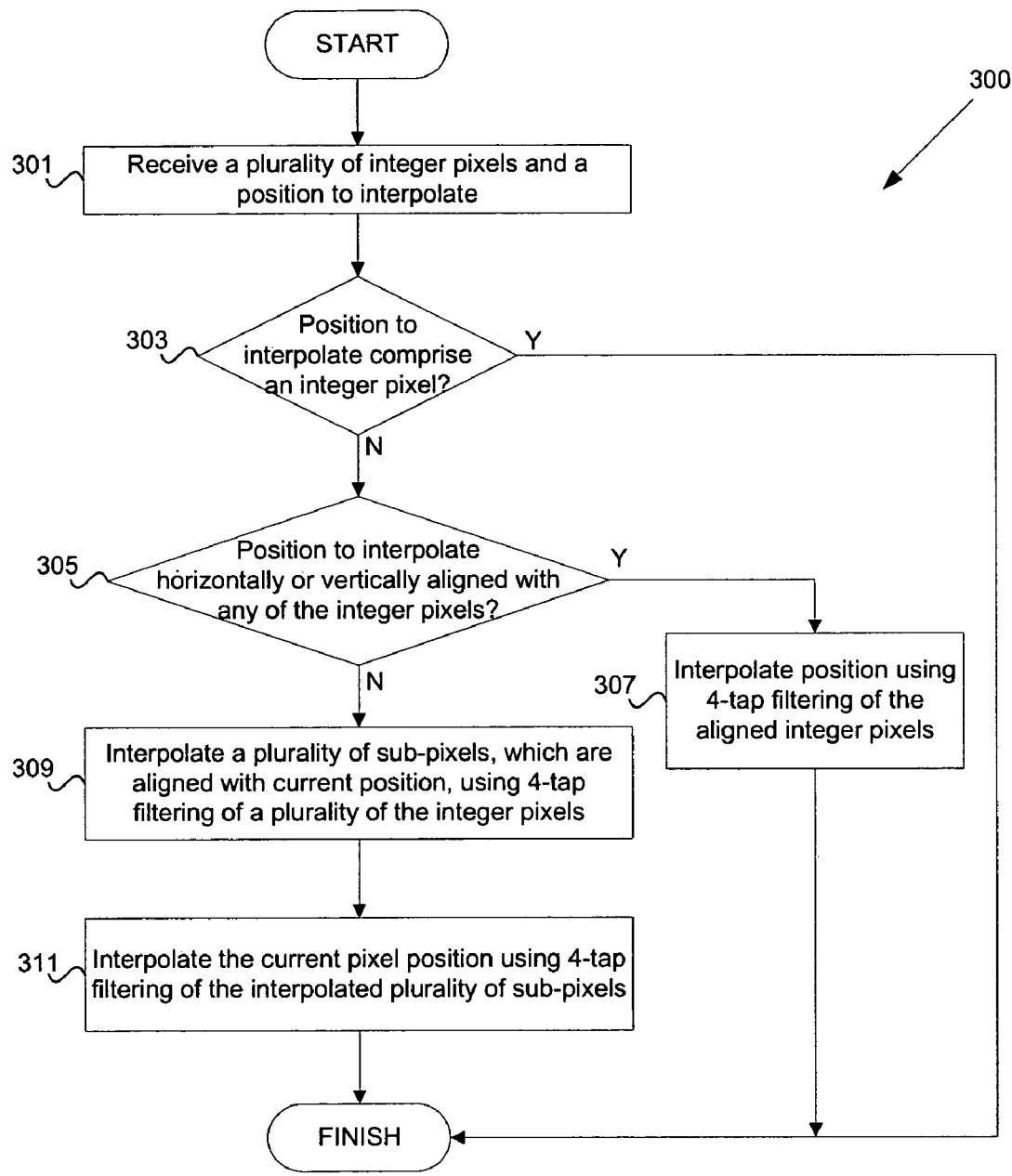
FIG. 3 is a flow diagram of an exemplary method for two-pass interpolation for motion compensation, in accordance with an embodiment of the invention.

FIG. 3 is a flow diagram of an exemplary method 300 for two-pass interpolation for motion compensation, in accordance with an embodiment of the invention. At 301, a plurality of integer positions may be received, together with a sub-pixel position for interpolation. At 303, it may be determined whether the position to interpolate comprises an integer position. If the position to interpolate comprises an integer position, no interpolation may be required. If the position to interpolate does not comprise an integer position, at 305, it may be determined whether the position to interpolate is horizontally or vertically aligned with any of the received integer positions.

If the position to interpolate is horizontally or vertically aligned with any of the received integer positions a one-step interpolation may be utilized. More specifically, at 307, the position may be interpolated utilizing 4-tap filtering of the aligned integer positions. The filtering operation may be determined from the pixel distance between the currently interpolated position and a known integer positions. If the position to interpolate is not horizontally or vertically aligned with any of the received integer positions a two-step interpolation may be utilized. At 309, a plurality of sub-pixels aligned with the current position may be interpolated utilizing 4-tap filtering of a plurality of the integer positions. At 311, the current position may be interpolated utilizing 4-tap filtering of the interpolated plurality of sub-pixels.

Figure 4:
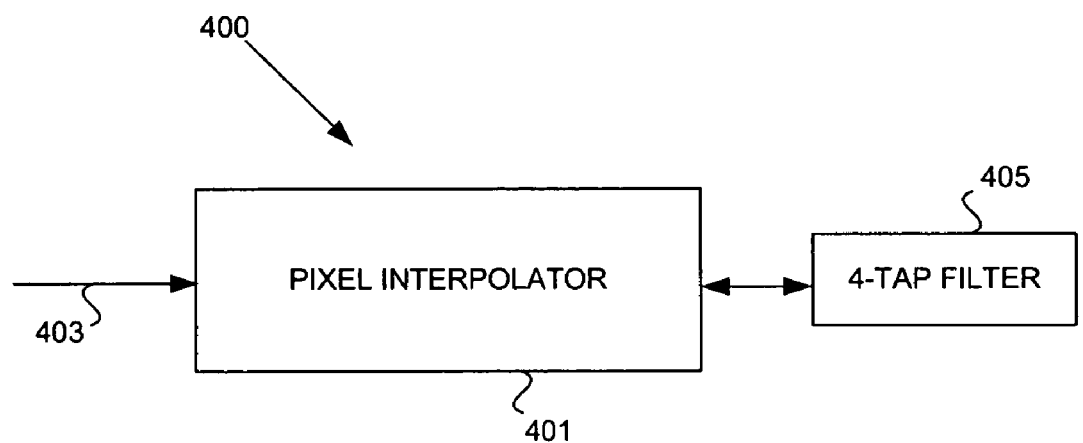
FIG. 4 is an exemplary system that may be utilized for two-pass interpolation for motion compensation, in accordance with an embodiment of the invention.

FIG. 4 is an exemplary system 400 that may be utilized for two-pass interpolation for motion compensation, in accordance with an embodiment of the invention. Referring to FIG. 4, the system 400 may comprise a pixel interpolator 401 and a 4-tap filter 405, which is communicatively coupled to the pixel interpolator 401.

In operation, the pixel interpolator 401 may comprise suitable logic, circuitry and/or code and may be adapted to receive a video signal 403 and interpolate pixels utilizing at most two passes. During a first of the two passes, the pixel interpolator 401 may interpolate an aligned sub-pixel value utilizing a plurality of integer positions, if the aligned sub-pixel value is horizontally or vertically aligned with the plurality of integer positions. During a second of the two passes, the pixel interpolator 401 may interpolate a non-aligned sub-pixel value utilizing the interpolated aligned sub-pixel value, if the non-aligned sub-pixel value is not horizontally or vertically aligned with the plurality of integer positions. The pixel interpolator 401 may interpolate the aligned sub-pixel value utilizing the 4-tap filter 405 to filter the integer positions. The 4-tap filter 405 may utilize one or more of the following filtering operations:

$$f1(x, y, z, w) = (-5x + 56y + 15z - 2w + 32) >> 6;$$

$$f2(x, y, z, w) = (-5x + 37y + 37z - 5w + 32) >> 6; \text{ and}$$

$$f3(x, y, z, w) = (-2x + 15y + 56z - 5w + 32) >> 6.$$

The pixel interpolator 401 may interpolate the non-aligned sub-pixel value utilizing the 4-tap filter 405 to filter the interpolated aligned sub-pixel value. During the 4-tap filtering of the interpolated aligned sub-pixel value, the 4-tap filter 405 may utilize one or more of the following filtering operations:

$$f1(x, y, z, w) = (-5x + 56y + 15z - 2w + 32) >> 6;$$

$$f2(x, y, z, w) = (-5x + 37y + 37z - 5w + 32) >> 6; \text{ and}$$

$$f3(x, y, z, w) = (-2x + 15y + 56z - 5w + 32) >> 6.$$

In one aspect of the invention, integer pixel values, as utilized in the present invention, may comprise one or more values of integer location pixels, or an equivalent of such integer location pixel thereof. The present invention, therefore, may not be limited by a specific definition of the term "integer pixel value" as used herein, and other interpretations may also be utilized without narrowing the scope of the invention.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing a video signal, the method comprising: using a processor to perform the following steps:
   interpolating pixels utilizing at most two passes, wherein,
      during a first of the two passes,
         interpolating at least one aligned sub-pixel value utilizing a plurality of integer pixel values, if the at least one aligned sub-pixel value is horizontally or vertically aligned with the plurality of integer pixel values; and
      during a second of the two passes,
         interpolating at least one non-aligned sub-pixel value utilizing the interpolated at least one aligned sub-pixel value, if the at least one non-aligned sub-pixel value is not horizontally or vertically aligned with the plurality of integer pixel values.

2. The method according to claim 1, comprising interpolating the at least one aligned sub-pixel value utilizing 4-tap filtering of the integer pixel values.

3. The method according to claim 1, comprising interpolating the at least one aligned sub-pixel value utilizing 4-tap filtering of the integer pixel values, wherein the 4-tap filtering of the integer pixel values comprises performing at least one of the following filtering operations:

$$f1(x, y, z, w) = (-5x + 56y + 15z - 2w + 32) >> 6;$$

$$f2(x, y, z, w) = (-5x + 37y + 37z - 5w + 32) >> 6; \text{ and}$$

$$f3(x, y, z, w) = (-2x + 15y + 56z - 5w + 32) >> 6.$$

4. The method according to claim 1, comprising interpolating the at least one non-aligned sub-pixel value utilizing 4-tap filtering of the interpolated at least one aligned sub-pixel value.

5. The method according to claim 1, comprising interpolating the at least one non-aligned sub-pixel value utilizing 4-tap filtering of the interpolated at least one aligned sub-pixel value, wherein the 4-tap filtering of the interpolated at least one aligned sub-pixel value comprises performing at least one of the following filtering operations:

$$f1(x, y, z, w) = (-5x + 56y + 15z - 2w + 32) >> 6;$$

$$f2(x, y, z, w) = (-5x + 37y + 37z - 5w + 32) >> 6; \text{ and}$$

$$f3(x, y, z, w) = (-2x + 15y + 56z - 5w + 32) >> 6.$$

6. The method according to claim 1, comprising interpolating the at least one aligned sub-pixel value utilizing at least one of a plurality of polyphase filters to filter the integer pixel values.

7. The method according to claim 6, comprising interpolating the at least one non-aligned sub-pixel value utilizing at least one of a plurality of polyphase filters to filter the interpolated at least one aligned sub-pixel value.

8. A computer-readable storage medium having stored thereon, a computer program having at least one code section for processing a video signal, the at least one code section being executable by a computer for causing the computer to perform steps comprising:
   interpolating pixels utilizing at most two passes, wherein,
      during a first of the two passes,
         interpolating at least one aligned sub-pixel value utilizing a plurality of integer pixel values, if the at least one aligned sub-pixel value is horizontally or vertically aligned with the plurality of integer pixel values; and
      during a second of the two passes,
         interpolating at least one non-aligned sub-pixel value utilizing the interpolated at least one aligned sub-pixel value, if the at least one non-aligned sub-pixel value is not horizontally or vertically aligned with the plurality of integer pixel values.

9. The computer-readable storage medium according to claim 8, comprising code for interpolating the at least one aligned sub-pixel value utilizing 4-tap filtering of the integer pixel values.

10. The computer-readable storage medium according to claim 8, comprising code for interpolating the at least one aligned sub-pixel value utilizing 4-tap filtering of the integer pixel values, wherein the 4-tap filtering of the integer pixel values comprises performing at least one of the following filtering operations:

$$f1(x, y, z, w)=(-5x+56y+15z-2w+32)>>6;$$

$$f2(x, y, z, w)=(-5x+37y+37z-5w+32)>>6; \text{ and}$$

$$f3(x, y, z, w)=(-2x+15y+56z-5w+32)>>6.$$

11. The computer-readable storage medium according to claim 8, comprising code for interpolating the at least one non-aligned sub-pixel value utilizing 4-tap filtering of the interpolated at least one aligned sub-pixel value.

12. The computer-readable storage medium according to claim 8, comprising code for interpolating the at least one non-aligned sub-pixel value utilizing 4-tap filtering of the interpolated at least one aligned sub-pixel value, wherein the 4-tap filtering of the interpolated at least one aligned sub-pixel value comprises performing at least one of the following filtering operations:

$$f1(x, y, z, w)=(-5x+56y+15z-2w+32)>>6;$$

$$f2(x, y, z, w)=(-5x+37y+37z-5w+32)>>6; \text{ and}$$

$$f3(x, y, z, w)=(-2x+15y+56z-5w+32)>>6.$$

13. The computer-readable storage medium according to claim 8, comprising code for interpolating the at least one aligned sub-pixel value utilizing at least one of a plurality of polyphase filters to filter the integer pixel values.

14. The computer-readable storage medium according to claim 13, comprising code for interpolating the at least one non-aligned sub-pixel value utilizing at least one of a plurality of polyphase filters to filter the interpolated at least one aligned sub-pixel value.

15. A system for processing a video signal, the system comprising:

A computer comprising: an interpolator, said interpolator interpolates pixels utilizing at most two passes, wherein,
during a first of the two passes,
the interpolator interpolates at least one aligned sub-pixel value utilizing a plurality of integer pixel values, if the at least one aligned sub-pixel value is horizontally or vertically aligned with the plurality of integer pixel values; and
during a second of the two passes,
the interpolator interpolates at least one non-aligned sub-pixel value utilizing the interpolated at least one aligned sub-pixel value, if the at least one non-aligned sub-pixel value is not horizontally or vertically aligned with the plurality of integer pixel values.

16. The system according to claim 15, comprising a 4-tap filter for filtering the integer pixel values during interpolation of the at least one aligned sub-pixel value.

17. The system according to claim 15, comprising a 4-tap filter for filtering the integer pixel values during interpolation of the at least one aligned sub-pixel value, wherein the 4-tap filter utilizes at least one of the following filtering operations:

$$f1(x, y, z, w)=(-5x+56y+15z-2w+32)>>6;$$

$$f2(x, y, z, w)=(-5x+37y+37z-5w+32)>>6; \text{ and}$$

$$f3(x, y, z, w)=(-2x+15y+56z-5w+32)>>6.$$

18. The system according to claim 15, comprising a 4-tap filter for filtering the interpolated at least one aligned sub-pixel value during interpolation of the at least one non-aligned sub-pixel value.

19. The system according to claim 15, comprising a 4-tap filter for filtering the interpolated at least one aligned sub-pixel value during interpolation of the at least one non-aligned sub-pixel value, wherein the 4-tap filter utilizes at least one of the following filtering operations:

$$f1(x, y, z, w)=(-5x+56y+15z-2w+32)>>6;$$

$$f2(x, y, z, w)=(-5x+37y+37z-5w+32)>>6; \text{ and}$$

$$f3(x, y, z, w)=(-2x+15y+56z-5w+32)>>6.$$

20. The system according to claim 15, wherein the interpolator interpolates the at least one aligned sub-pixel value utilizing at least one of a plurality of polyphase filters to filter the integer pixel values.

21. The system according to claim 20, wherein the interpolator interpolates the at least one non-aligned sub-pixel value utilizing at least one of a plurality of polyphase filters to filter the interpolated at least one aligned sub-pixel value.

22. A method for processing a video signal, the method comprising: using processor to perform the following steps:
receiving video encoded in accordance with a digital video compression format; and
interpolating pixels of the video utilizing at most two passes of filtering wherein,
during a first pass of the two passes,
interpolating at least one aligned sub-pixel value utilizing a plurality of integer pixel values, if the at least one aligned sub-pixel value is horizontally or vertically aligned with the plurality of integer pixel values; and
during a second of the two passes,
interpolating at least one non-aligned sub-pixel value utilizing the interpolated at least one aligned sub-pixel value, if the at least one non-aligned sub-pixel value is not horizontally or vertically aligned with the plurality of integer pixel values.

23. A system for processing a video signal comprising:
A computer comprising: an interpolator, said interpolator interpolates pixels of digital video data utilizing at most two passes of filtering, wherein,
during a first of the two passes,
the interpolator interpolates at least one aligned sub-pixel value utilizing a plurality of integer pixel values, if the at least one aligned sub-pixel value is horizontally or vertically aligned with the plurality of integer pixel values; and
during a second of the two passes,
the interpolator interpolates at least one non-aligned sub-pixel value utilizing the interpolated at least one aligned sub-pixel value, if the at least one non-aligned sub-pixel value is not horizontally or vertically aligned with the plurality of integer pixel values.

* * * * *